(No Model.)
W. S. RICHARDSON.
FASTENING FOR OVERCOATS, &c.
No. 443,634. Patented Dec. 30, 1890.
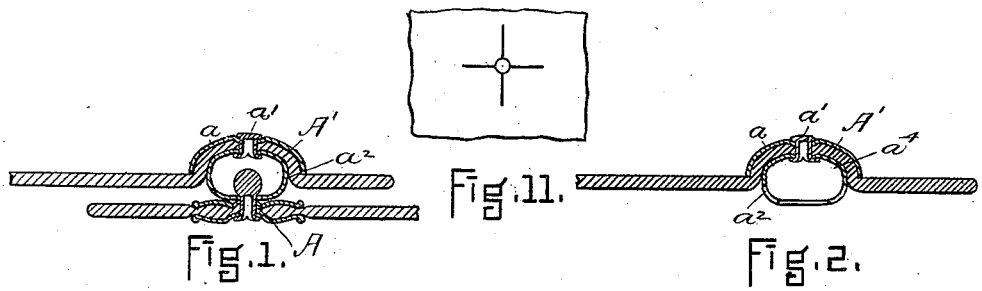
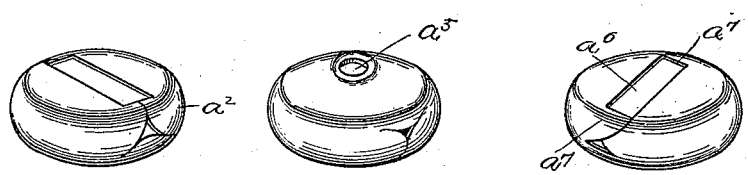
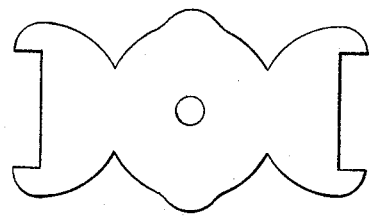
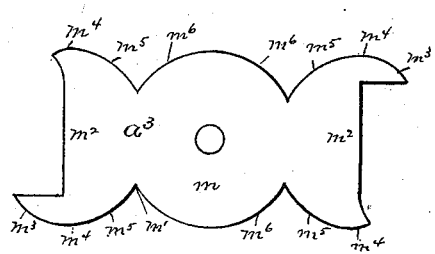
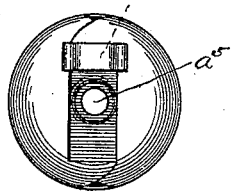
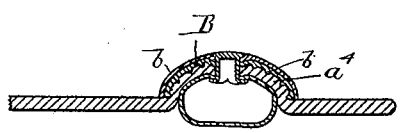
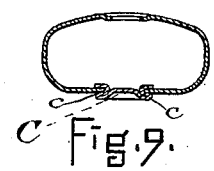
WITNESSES.
J. M. Dolan
Fred. B. Dolan
INVENTOR.
William S. Richardson
by his attys
Clarke & Raymond
THE NORRIS PETERS CO., PHOTO-LITHO., WASHINGTON, D. C.

UNITED STATES PATENT OFFICE.

WILLIAM STREETER RICHARDSON, OF BOSTON, MASSACHUSETTS.

FASTENING FOR OVERCOATS, &c.

SPECIFICATION forming part of Letters Patent No. 443,634, dated December 30, 1890.

Application filed January 3, 1887. Serial No. 223,203. (No model.) Patented in England August 2, 1889, No. 12,314, and January 14, 1890, No. 662; in France March 10, 1890, No. 204,261, and in Belgium March 10, 1890, No. 89,777.

*To all whom it may concern:*

Be it known that I, WILLIAM STREETER RICHARDSON, of Boston, in the county of Suffolk and State of Massachusetts, a citizen of the United States, have invented a new and useful Improvement in Fastenings for Overcoats and other Purposes, (for which I have obtained Letters Patent in Great Britain, dated August 2, 1889, No. 12,314, and January 14, 1890, No. 662; in France, dated March 10, 1890, No. 204,261, and in Belgium, dated March 10, 1890, No. 89,777,) of which the following is a full, clear, and exact description, reference being had to the accompanying drawings, forming a part of this specification, in explaining its nature.

The invention relates to a fastening especially adapted for use on rubber overcoats and rubber overshoes and for uses of a similar character, although it may be employed on gloves and other smaller articles.

It comprises two members or parts, one of which is a ball or stud and the other of which is the holding device or socket member; and the invention relates especially to this part of the fastening, particularly to the form of the socket, the shape of its mouth or entrance, and the manner of securing it to the coat or other material.

In the drawings, Figure 1 is a view in central section of a fastening containing the features of my invention. Fig. 2 is a view in central section of the socket or receiving member of the fastening. Figs. 3 and 4 are views in perspective of a part of the socket or receiving member of the fastening, to which reference will be hereinafter made. Fig. 5 is a view in plan of the blank from which the part or section represented in Fig. 3 is made. Fig. 6 is a view in plan of the part from which the part represented in Fig. 4 is made. Fig. 7 is a view in section illustrating the employment of an additional piece or section for the purposes hereinafter explained. Fig. 8 is a view in plan of the socket or receiving member of the fastening to illustrate the employment of a sliding graduating-plate. Fig. 9 is a section further illustrating the said plate and the manner in which it is secured to the fastening. Fig. 10 is a central section illustrating the use of a cap made by molding in lieu of the cap made by striking up or spinning. Fig. 11 represents the manner of preparing the material for the socket or receiving member of the fastening. Fig. 12 is a view in perspective of a section thereof to show the form of its inner surface or that which is covered by the material.

A represents the ball or stud member of the fastening, and A' the socket or other member of the fastening. The ball member of the fastening is secured in place to the fabric or coat or other article upon which it is used in any desirable way, so that it shall project, preferably, from the outer surface thereof. The other member of the fastening is secured to the fabric of the coat or other article with which it is used, so that the receiving portion of the device shall be on the inner or under side of the fabric and the holding cap or section upon the outer or exposed surface of the fabric. This section of the fabric is represented as made up of the cap $a$, the rivet $a'$, and the part $a^2$, which is fastened to the cap by the centrally-located rivet or fastening $a'$, which passes through a hole in the material. The part $a^2$ is made, preferably, from the blank $a^3$, (see Fig. 6,) and this blank is formed to the shape represented in Fig. 3—that is, it has the rounded upper surface $a^4$, the central hole $a^5$, and the oblong or rectangular entrance or mouth $a^6$. Preferably the blank is so formed as to provide continuous ends $a^7$ to the mouth, as represented in Fig. 4, the joints being arranged to come at the corners. This is an advantage, because the strain or draft of the ball or stud is against the end of this passage or mouth. In use this part of the fastening is placed upon the under or inner side of the fabric to which it is attached, a hole is formed in the fabric and a cap placed upon the other side, and the two parts united to each other by a rivet or other fastening passed from the cap through the material into the hole of this section, which is upset upon its upper inner surface. Of course this central fastening may be integral with the cap; or it may be a rivet or a tack, or a capped eyelet or a tubular eyelet, or any of the well-known fastenings.

The value of the invention consists in the great holding power which the member $a'$ possesses.

In use the ball or stud preferably is inserted at the center of the length of the mouth or opening, and is then drawn toward one end thereof, so that it bears against the cross-bar or edge at the end of the passage or mouth, and as there is very little spring in the side edges of the mouth close or adjacent to the ends it follows that the stud or ball is very firmly held in place when moved into this position.

For rubber coats and garments of a like character it is desirable, in order to provide a smooth or flat finish, or, in other words, to prevent the wrinkling or puckering of the goods, to prepare the goods for the reception of this member of the fastening by forming cuts which extend across each other, substantially as shown in Fig. 11, and when this step is necessary I use in addition to the parts above enumerated an additional collet or piece B, which is provided with the points $b$, and which is placed either immediately beneath the cap, as represented in Fig. 7, in which case the points will extend downward or into the fabric, or immediately over the under section $a^2$ of the member, in which case the prongs will extend upwardly into the fabric, the object of this piece being to hold the edges of the fabric securely together, so that the cuts made therein to produce the flat finish shall not weaken the fabric.

In Figs. 8 and 9 I have represented the member A' of the fastening as provided with a slide C, whereby it is made to a certain degree adjustable. This slide comprises a piece of sheet metal formed or shaped upon its edges $c$ to slide upon the side edges of the mouth or entrance, and by its use two positions for the ball or stud are obtained—first, that which obtains when the ball or stud is placed so as to bear against the end bar $a^7$ of the section, and, second, that secured when the stud or ball is placed so as to bear against the edge of the movable adjusting-plate. Of course the advantages of the pronged piece can to a certain extent be obtained by forming the prongs either upon the cap itself or from the upper surface of the part $a^2$; but I prefer to make it as an independent piece.

I would say that in lieu of the metal cap represented in Figs. 1 and 2 I prefer to use for certain purposes and reasons a cap not made of metal by striking up, but of material which is molded or pressed to shape—such, for instance, as vulcanite or other compound—or which may be turned—as, for instance, wood or bone. A cap of this form or made in this way gives greater variety than is obtained by an all-metal cap, and is also much cheaper.

It will be seen that the blank from which the spring or socket member of the fastening is formed is cut from flat metal and has the central or intermediate metal section $m$, which is formed to make the rounded top of the spring portion, the neck $m'$, on each side of the intermediate portion, and the jaw-forming sections $m^2$, in the edge of each of which a portion of a recess is formed, and which sections $m^2$ are curved and bent to a shape to bring their edges $m^4$ together, or nearly so, and their edges $m^5$ in contact with the edges $m^6$ of the blank and to form jaws which are curved horizontally and vertically.

Having thus fully described my invention, I claim and desire to secure by Letters Patent of the United States—

1. In a fastening for coats and similar purposes, the combination of a ball or stud as one member of the fastening with the other member of the fastening having as a part the socket-section $a^2$, of sheet metal, provided with the long mouth or opening $a^6$, into which the ball member is inserted and adapted to be attached to the fabric or material, substantially as and for the purposes described.

2. In a member of a fastening, the sheet-metal section $a^2$, having the long opening or mouth $a^6$, adapted to receive a ball or male member of a fastening, and the continuous metal ends $a^7$, as and for the purposes described.

3. The combination, in a member of a fastening, of the cap $a$, adapted to be placed upon one side of the fabric or material to which the member is secured, the sheet-metal section $a^2$, adapted to be placed upon the other side of the fabric or material and having the long mouth or opening $a^6$, and a stud or rivet or other fastening for securing the two sections or parts together and to the material, substantially as described.

4. In a member of a fastening having a long mouth or opening $a^6$ as a means of graduating the opening, a movable plate C, secured to the section to slide in the opening from one end thereof to the other, as and for the purposes described.

5. The combination, in a member of a fastening, of the cap $a$, the part $a^2$, and the interposed pronged piece $b$, the prongs of which extend into the material to which the fastening is secured, and a fastening for locking the three parts together, substantially as described.

6. A blank for forming spring-sections of a fastener, having a central section $m$ for forming the cap or dome of the fastener, the necks $m'$, and the jaw-forming section $m^2$, provided with the oblique ends $m^3$, substantially as described.

7. In a fastening device, the spring member formed of a single piece of sheet metal and composed of a dome-shaped portion constructed from the disk-shaped center of the oblong blank and the integral jaws formed from the extremities of said blank, said jaws being bent horizontally and completely covered by the dome portion, thus forming a slot or opening for the reception of the ball member of the fastening, substantially as described.

WILLIAM STREETER RICHARDSON.

Witnesses:
F. F. RAYMOND, 2d,
J. M. DOLAN.

It is hereby certified that in Letters Patent No. 443,634, granted December 30, 1890, upon the application of William Streeter Richardson, of Boston, Massachusetts, for an improvement in "Fastenings for Overcoats, etc.," errors appear requiring correction, as follows: The words "subject to the limitation prescribed by Sec. 4887, Rev. Stats., by reason of English patent dated August 2, 1889, No. 12,314, and January 14, 1890, No. 662; French patent dated March 10, 1890, No. 204,261; and Belgian patent dated March 10, 1890, No. 89,777," at the end of the grant and the words "Patented in England August 2, 1889, No. 12,314, and January 14, 1890, No. 662; in France March 10, 1890, No. 204,261; and in Belgium March 10, 1890, No. 89,777," at the head of the specification should be stricken out, the same having been inserted by the Patent Office through mistake; and that the Letters Patent should be read with these corrections therein that the same may conform to the record of the case in the Patent Office.

Signed, countersigned, and sealed this 20th day of January A. D. 1891.

[SEAL.]

CYRUS BUSSEY,
*Assistant Secretary of the Interior.*

Countersigned:

C. E. MITCHELL,
*Commissioner of Patents.*